R. C. KELLEY.
MARKER FOR CORN PLANTERS.
APPLICATION FILED JAN. 18, 1915.
1,183,987.
Patented May 23, 1916.
2 SHEETS—SHEET 2.
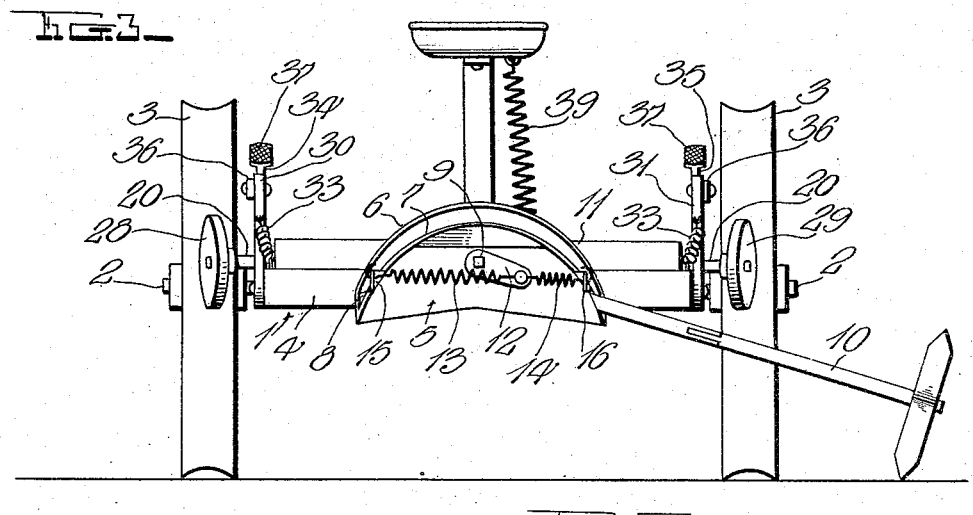
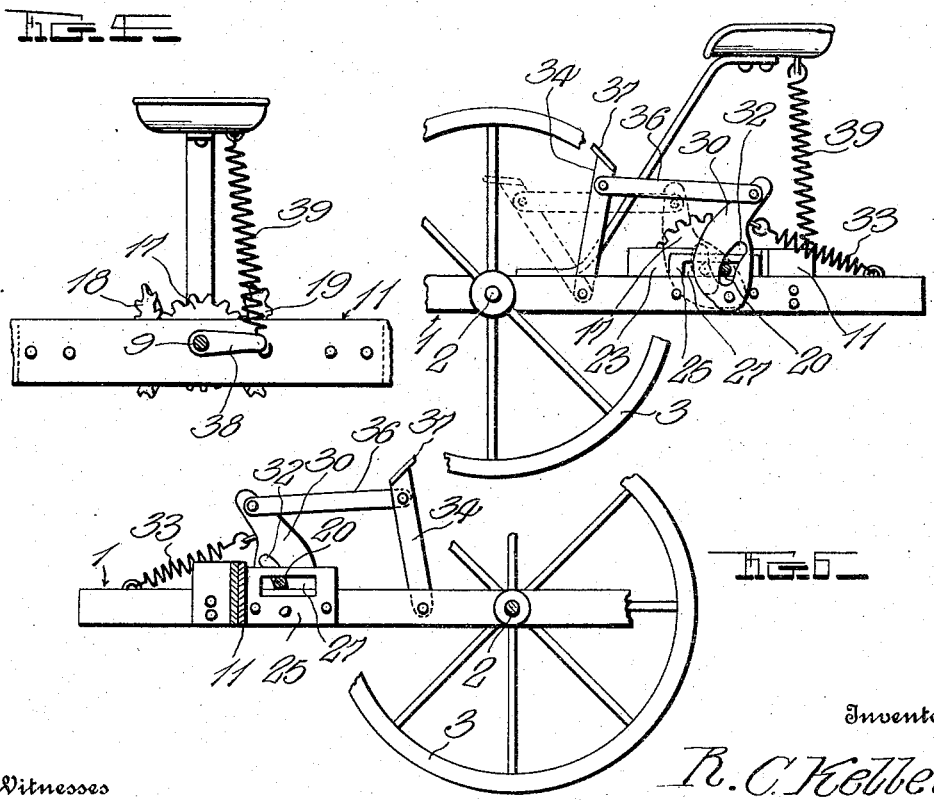
Witnesses
H. Woodard
Inventor
R. C. Kelley
By H. B. Willson & Co.
Attorneys

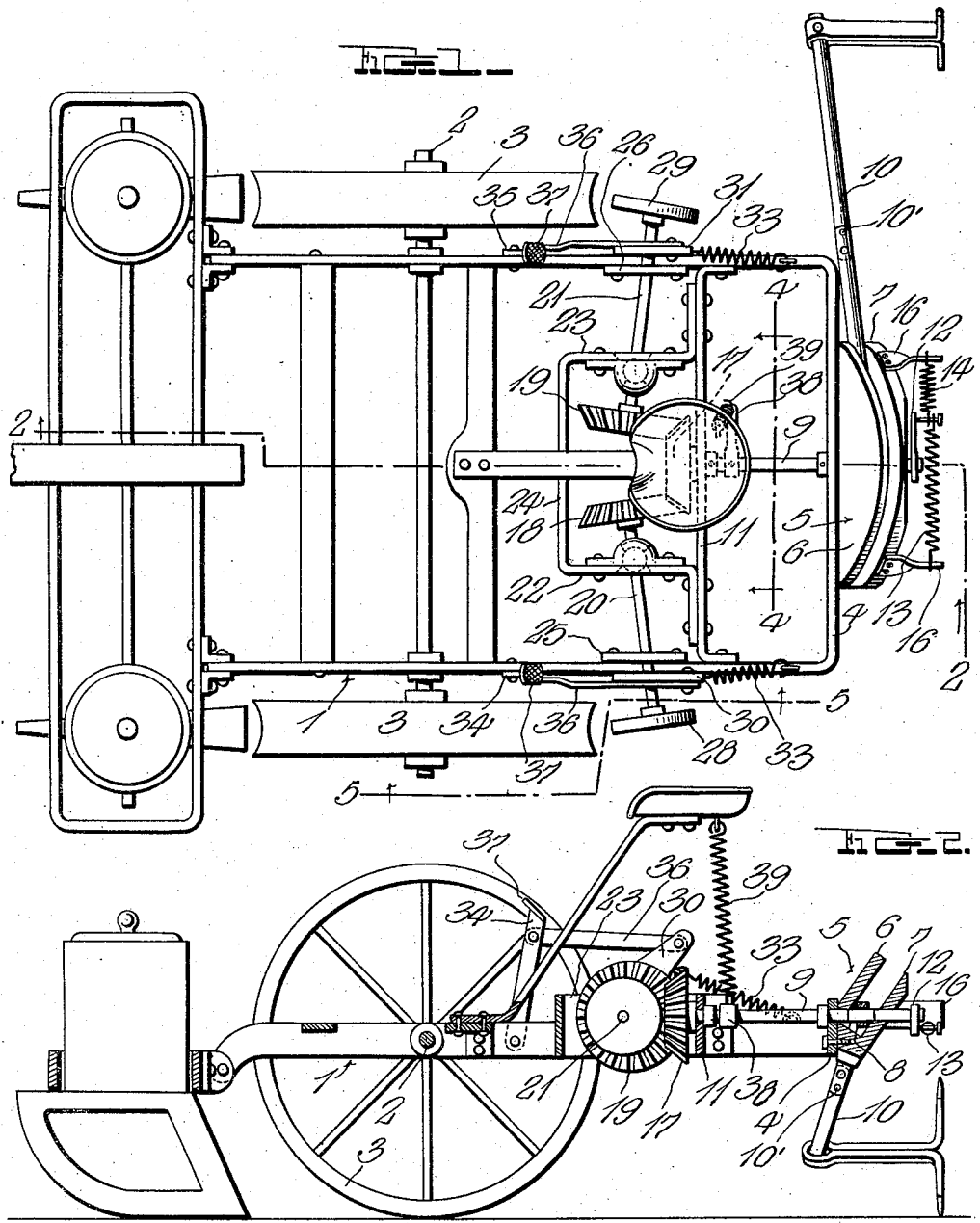

UNITED STATES PATENT OFFICE.

ROBERT C. KELLEY, OF CHAUTAUQUA, KANSAS.

MARKER FOR CORN-PLANTERS.

1,183,987.          Specification of Letters Patent.      Patented May 23, 1916.

Application filed January 18, 1915. Serial No. 2,973.

*To all whom it may concern:*

Be it known that I, ROBERT C. KELLEY, a citizen of the United States, residing at Chautauqua, in the county of Chautauqua and State of Kansas, have invented certain new and useful Improvement in Markers for Corn-Planters; and I do declare the following to be a full, clear, and exact description of the invention, such as will enable others skilled in the art to which it appertains to make and use the same.

This invention relates to planters and more particularly to marker attachments for this type of agricultural implement.

One object of the invention is to provide a marker which may be readily mounted upon the ordinary type of corn planter and be convenient to operate it so that the marker member may be easily raised when turning at the end of a row and which also may be operated from either side of the machine.

Another object of the invention is to provide a device of this character which embodies a safety appliance adapted to prevent the marker rod from breaking when the marker member strikes an immovable object.

Another object is to provide a device of this character which, when thrown into action by the operator, will be operated by the turning of the planter wheel or wheels.

With these and other objects in view, the invention consists of certain novel features of construction, and the combination and arrangement of parts as will be more fully described and claimed.

In the accompanying drawings: Figure 1 represents a top plan view showing an ordinary corn planter with this improved marker attachment applied; Fig. 2 is a longitudinal section thereof taken on the line 2—2 of Fig. 1; Fig. 3 is a rear elevation thereof with the marker shown in operative position; Fig. 4 is a detail transverse section taken on the line 4—4 of Fig. 1; Fig. 5 is a detail longitudinal section taken on the line 5—5 of Fig. 1 and with the marker controlling parts in inoperative position; Fig. 6 is a similar view viewed from the inside.

In the embodiment illustrated, an ordinary corn planter frame 1 is shown which is supported upon the wheel axle 2, the latter member carrying the usual covering and supporting wheels 3.

Secured to the rear member 4 of the frame 1, is a marker supporting bracket 5 here shown in the form of two laterally spaced plates 6 and 7 extending obliquely upward from said member 4 and secured together at their lower ends and between which the marker rod 10 is designed to be mounted. The connecting member 8 of the two plates 6 and 7, is preferably inclined downwardly in opposite directions from the center thereof and forms a support for the marker rod 10 when in operative lowered position at either side of the planter, it being understood that said rod is designed for use on one side or the other of the planter as may be desired.

The marker rod 10 is fixedly mounted on a shaft 9 which extends longitudinally of the frame 1 through a transversely disposed partition 11 of said frame and through the frame member 4 and plates 6 and 7, the openings in said members forming bearings for said shaft. As shown, the portion of this shaft 9 which extends between the plates 6 and 7, is made angular in cross section to receive a correspondingly shaped opening in the marker rod whereby said marker rod is fixedly mounted on said shaft and adapted to turn therewith.

An arm 12 is fixedly mounted on the outer end of the shaft 9, outside the plate 7 and the free end thereof is connected with the inner ends of two coiled springs 13 and 14 which extend in opposite directions and are connected at their free or outer ends with rearwardly extending brackets 15 and 16 which project from the plate 7. These springs operate to yieldably hold the arm in either of its positions at one side of the frame, when the marker rod is turned in one direction or the other, as is clearly shown in Figs. 1 and 2. Mounted on the front end of the shaft 9 beyond the partition 11, is a bevel gear wheel 17 which meshes with other bevel gears 18 and 19 mounted on shafts 20 and 21 which extend transversely of the planter frame and are mounted in suitable bearings formed in the side members 22 and 23 of an auxiliary frame which projects forwardly from the transverse partition 11 of the planter frame, said members being connected at their front ends by a cross bar or plate 24. These shafts 20 and 21 are also mounted in bearings 25 and 26 carried by the side members of the planter frame and which have longitudinally extending openings as 27 therein to provide for the sliding movement of said shafts longitudinally of the frame 1 for a purpose to be described.

The outer ends of these shafts 20 and 21, project beyond the opposite sides of the frame 1 and have mounted thereon wheels 28 and 29 which are positioned to engage the peripheries of the wheels 3 of the planter when the shafts 20 and 21 are moved forwardly in the bearings 27 and when so positioned, motion is imparted from the planter wheels to the shafts 20 and 21 and the bevel gears 18 and 19 carried at their inner ends and through which motion is imparted to the shaft 9 through the gear 17 carried by its inner end and with which said gears 18 and 19 mesh. It will be understood that one of the wheels 28 or 29 only is moved forward into engagement with its adjacent planter wheel to provide for the turning of the shaft 9 in one direction so as to raise the marker shaft and if desired, to swing it from one side of the planter frame to the other, it being obvious that the gears 18 and 19 turn in opposite directions and when one of the wheels 28 or 29 is in operative engagement with the planter wheel, the gear carried by the other shaft 20 or 21 will turn in the opposite direction and the wheel carried by this shaft being out of contact with the planter wheel, will have no influence upon the shaft 9.

Links or plates 30 and 31 are pivotally mounted on the opposite side members of the frame 1 adjacent the bearings 27 therein and below said bearings and are each provided with an arcuate slot 32 through which the rods 20 and 21 are designed to project and which are designed to move said rods 20 and 21 in forward or rearward direction according to the direction in which these links are turned. When the links are turned rearwardly, the front curved walls of the slots 32 will engage said rods and force them rearwardly as the slots in said links move over them into inoperative position as shown in full lines in Fig. 5 and when said links are moved forwardly, these curved slots will ride up on said rods and move them forwardly into operative position to position the wheel carried at the outer end thereof for contact with the corresponding planter wheel. Coiled springs 33 are connected at one end to the free ends of the links 30 and 31 and at their opposite ends to the side members of the planter frame 1 at points spaced rearwardly from said links and which exert their tension to normally hold said links in rearward retracted inoperative position, thereby yieldably holding the shafts 20 and 21 and the wheels 28 and 29 carried thereby out of engagement with the planter wheels.

Operating levers 34 and 35 are fulcrumed at their lower ends on the side members of the frame 1 in advance of the links 30 and 31 and project upwardly above said frame 1 and have their upper ends connected with the upper ends of the links 30 and 31 by connecting rods as 36, whereby on the movement of said lever in forward or rearward direction, said links will be correspondingly moved, it being understood that the rods 36 are pivotally connected at their ends with said levers and links to provide for this movement. The free upper ends of these levers are preferably provided with foot rests as 37 so that the driver of the machine may operate the marker with his feet.

From the above, it will be understood, that when one of the levers 34 or 35 is moved forwardly by the operator, the link connected therewith, will be correspondingly moved against the tension of its spring 33 which will cause the shaft passing through the arcuate slot in the link, to ride upwardly in said slot and thus be moved forwardly into position for disposing the wheel at the end of the shaft into operative engagement with the planter wheel and when so disposed, the turning of the planter wheel would impart motion to the wheel on the end of the transverse shaft and through said shaft, motion will be imparted to the bevel gear at the end thereof which, meshing with the gear 17, will turn the longitudinally extending shaft 9 and thus raise the marker rod into any desired position, either just enough to cause the marker member to clear the ground or to swing it entirely over to the opposite side of the planter, according to the wishes of the operator. It is to be understood that when the marker member is to be raised a slight distance and not turned entirely over, the operator will throw the lever forward for a short period only sufficient to cause the turning of shaft 9 the desired distance for raising said marker member the required height.

Fixed to the shaft 9, preferably adjacent the rear face of the partition 11, is a laterally extending arm 38 which is connected by means of a coiled spring 39 with a fixed support which is preferably the under face of the seat of the planter to assist in yieldably holding the shaft in adjusted position and which coöperates with the springs 13 and 14 to aid in lifting the marker rod and to cushion its lowering movement.

The auxiliary frame carrying the bevel gears, is preferably positioned under the seat of the planter frame to dispose it out of the way of the other parts of the planter.

The marker rod 10 as shown, is composed of two sections pivotally connected, one section having its connecting end bifurcated and the other section having a tongue mounted between the furcations of the first mentioned sections and pivotally connected therein at points spaced from the free ends of said furcations. To hold these sections in longitudinal alinement, a frangible pin 10' extends through the free ends of the furcations of one section and the tongue of the other and has sufficient strength under ordinary circumstances to hold the sections of the marker rod in alinement. If, however, the marker member should engage an immovable object such as a stump or a large rock, the pin 10' will break and the outer section of the marker rod will pivot on the inner section, thus preventing said rod from breaking.

I claim as my invention:

1. In combination with a wheel supported planter frame, of a shaft journaled therein, a marker fixed to said shaft, a lever, shiftable rods each having an annular member fixed thereto and adapted for engaging one of the planter wheels, a gear connection between said rods and shaft, whereby the shaft may be positively rotated in either direction, links pivotally mounted at one end on said frame and each having an arcuate slot therein through which one of said rods project, and a connection between said lever and links whereby said rods may be shifted to bring its annular wheel engaging member into or out of position with the wheels.

2. In combination with a wheel supported planter frame, of a shaft journaled therein, a marker fixed to said shaft, a lever, shiftable rods each having an annular member fixed thereto and adapted for engaging one of the planter wheels, a gear connection between said rods and shaft, whereby the shaft may be positively rotated in either direction, links pivotally mounted at one end on said frame and each having an arcuate slot therein through which one of said rods projects, a connection between said lever and links whereby said rods may be shifted to bring their annular wheel engaging members into or out of position for engagement with the wheels, and coiled springs connecting said links and said frame for normally holding said links in retracted position whereby said wheel engaging members are held out of contact with the wheels.

3. The combination with a wheel supported frame, of a shaft journaled therein and extending longitudinally thereof, a marker rod fixed to said shaft, a marking element carried by said rod, a supporting bracket mounted on said frame and having laterally spaced members extending transversely of the frame and between which said marker rod is adapted to move, a rod supporting member disposed between said plates and inclining downwardly in opposite directions from its center toward its ends, shaft operating means having an element adapted to engage one of the planter wheels, whereby the shaft may be positively rotated, a lever and a connection between said lever, and shaft operating means whereby said wheel engaging element may be moved into or out of engagement with said wheel.

4. The combination with a wheel supported frame, of a shaft journaled therein and extending longitudinally thereof, a marker rod fixed to said shaft, a marking element carried by said rod, a supporting bracket mounted on said frame and having laterally spaced members extending transversely of the marker and between which said marker rod is adapted to move, a rod supporting member disposed between said plates and inclining downwardly in opposite directions from its center toward its ends, and means under the control of the operator for turning said shaft in either direction.

5. The combination with a wheel supported frame, of a shaft journaled therein and extending longitudinally thereof, a marker rod fixed to said shaft, a marking element carried by said rod, a supporting bracket mounted on said frame and having laterally spaced members extending transversely of the marker and between which said marker rod is adapted to move, a rod support member disposed between said plates and inclining downwardly in opposite directions from its center toward its ends, said longitudinal shaft extending through said plates, an arm fixed to said shaft outside said plates, and coiled springs connected at one end to the free end of said arm and extending in opposite directions and connected to said plates.

In testimony whereof I have hereunto set my hand in presence of two subscribing witnesses.

ROBERT C. KELLEY.

Witnesses:
VIOLA TURNER,
GARLAND MCCAY.

Copies of this patent may be obtained for five cents each, by addressing the "Commissioner of Patents, Washington, D. C."